United States Patent Office 2,977,914
Patented Apr. 4, 1961

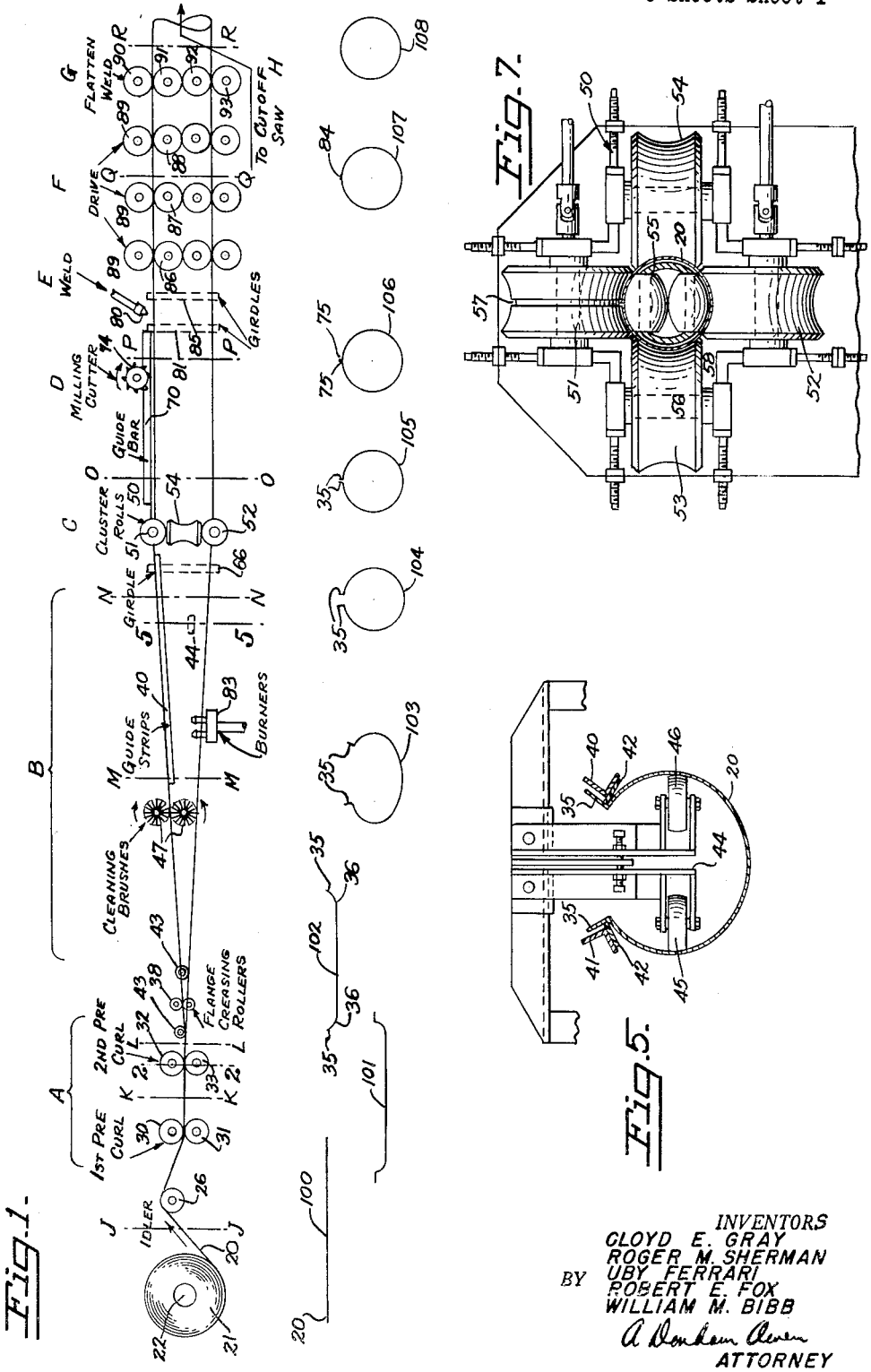

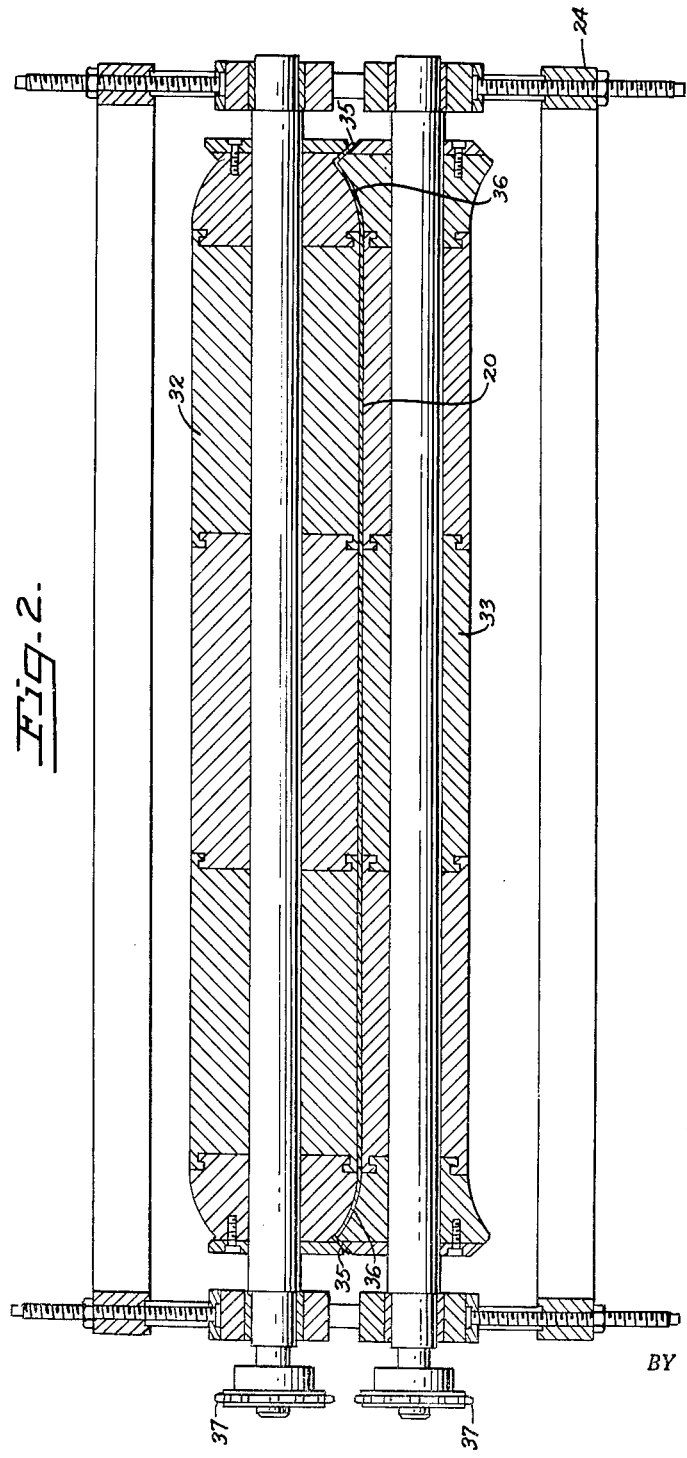

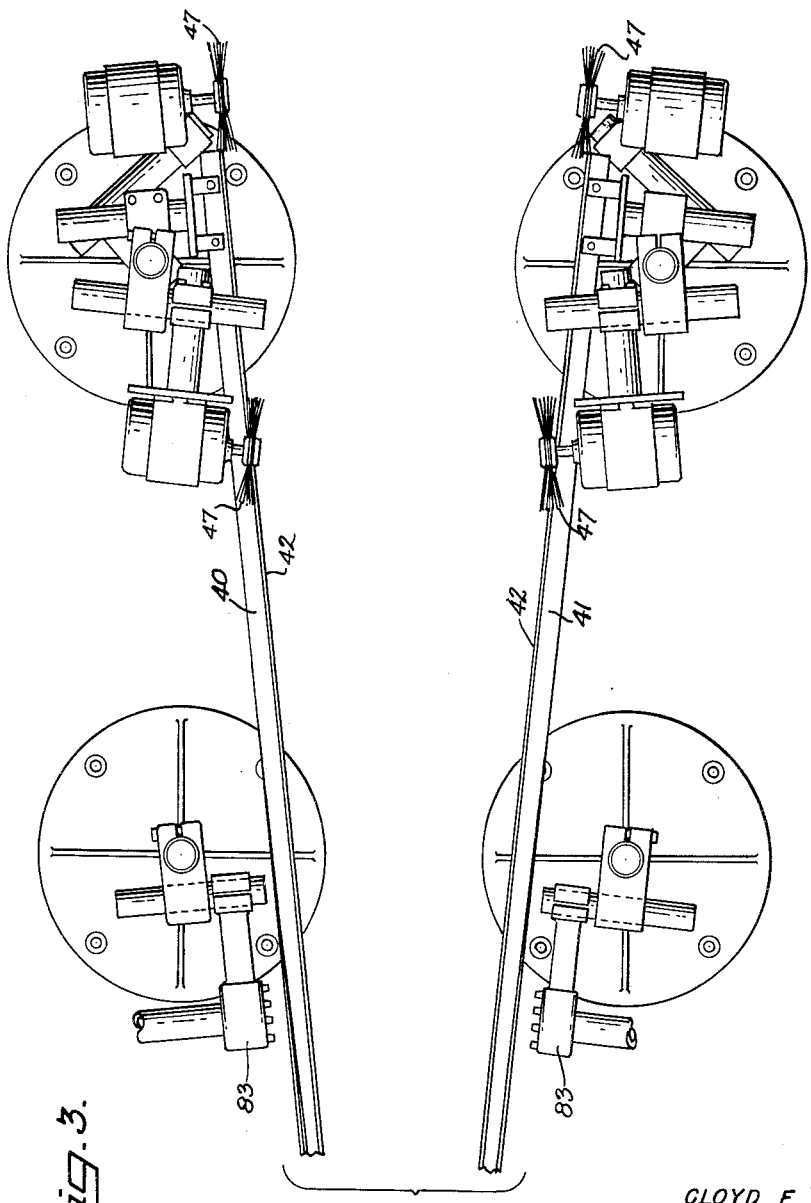

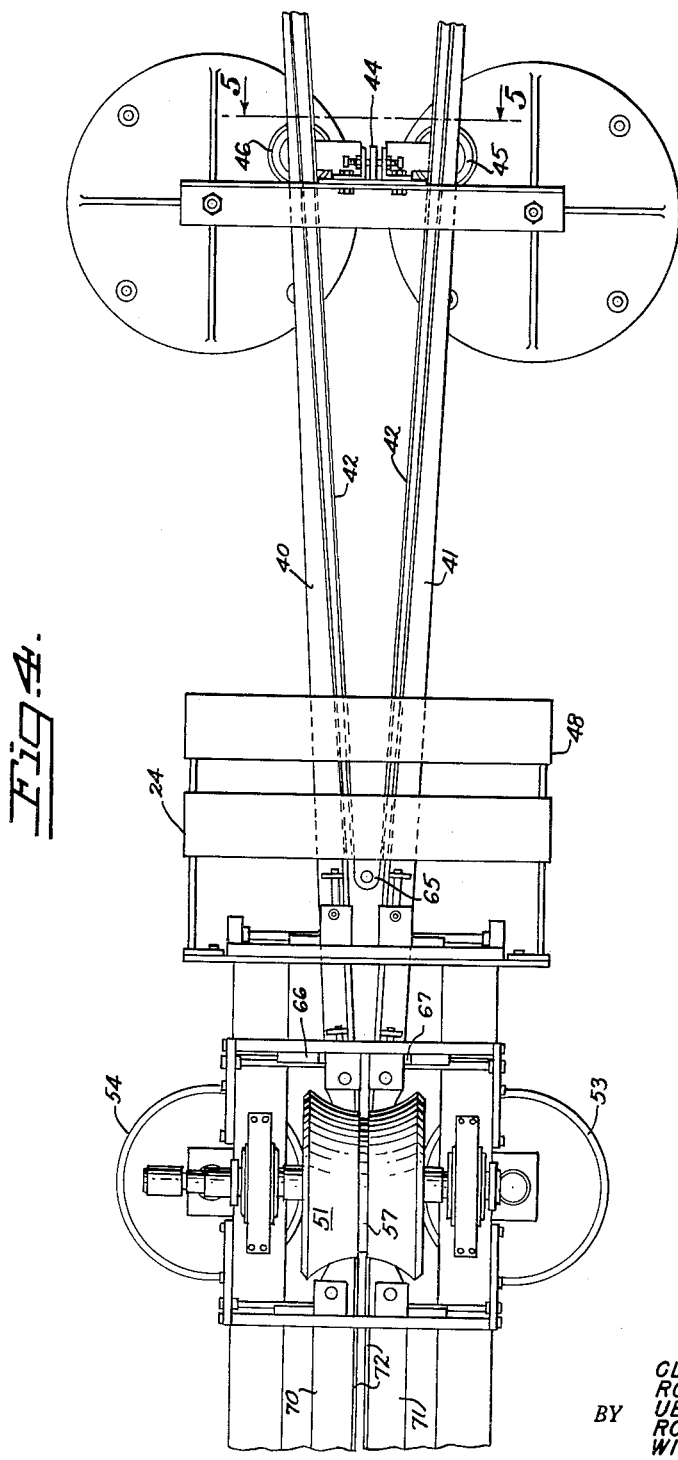

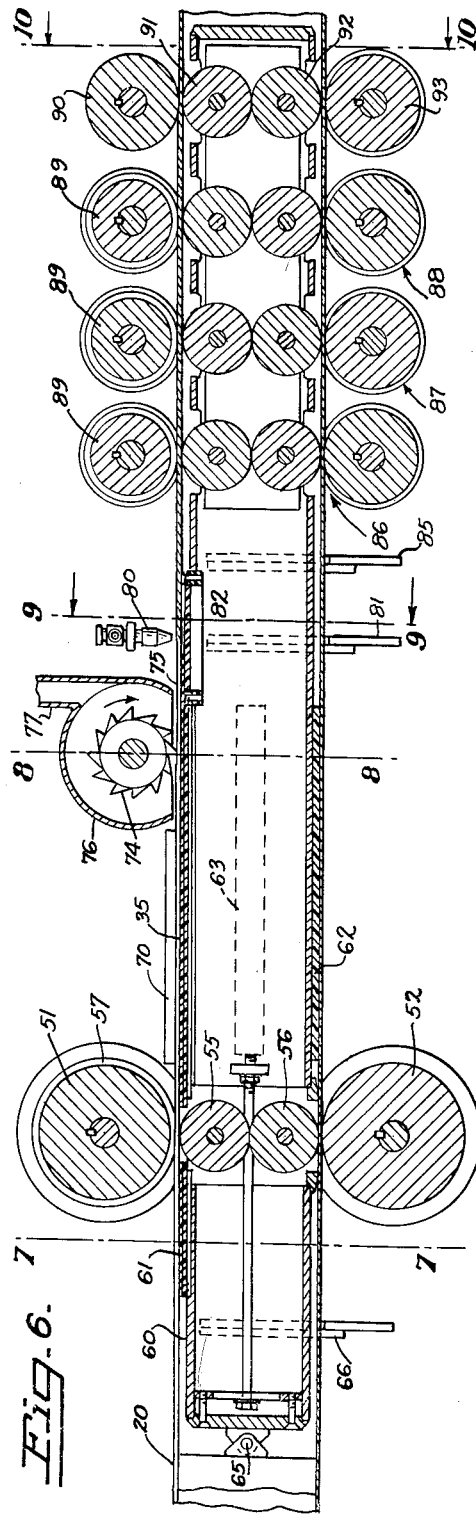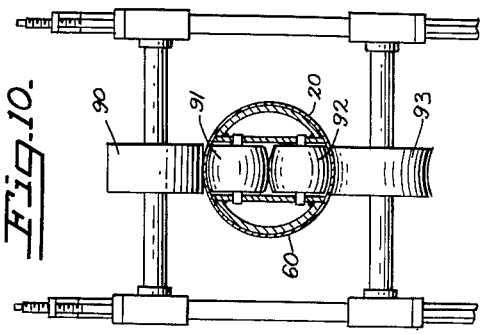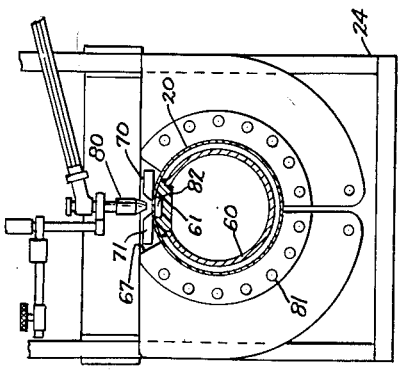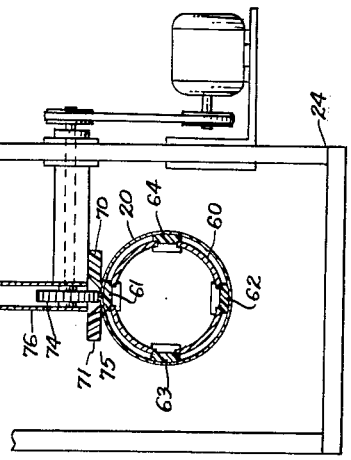
April 4, 1961 C. E. GRAY ET AL 2,977,914
TUBE MILL AND METHOD OF MANUFACTURE OF THIN WALLED TUBING
Filed June 27, 1955 5 Sheets-Sheet 5
INVENTORS
CLOYD E. GRAY
ROGER M. SHERMAN
UBY FERRARI
ROBERT E. FOX
WILLIAM M. BIBB
BY
ATTORNEY

2,977,914

TUBE MILL AND METHOD OF MANUFACTURE OF THIN WALLED TUBING

Cloyd E. Gray and Roger M. Sherman, Palo Alto, Robert E. Fox, Redwood City, and Uby Ferrari and William Merle Bibb, Palo Alto, Calif., assignors to W. R. Ames Company, San Francisco, Calif., a corporation of California Filed June 27, 1955, Ser. No. 518,086

18 Claims. (Cl. 113—33)

This invention relates to improvements in tube mills. More particularly, it relates to an improved method and apparatus for the manufacture of tubing having a large ratio of diameter to wall thickness, and to an improved product resulting from employment of the method and apparatus. Still more particularly, the invention relates to the continuous manufacture of tubing whose diameter is very large in comparison with its wall thickness, the tubing having a single seam closed by a weld and being produced from a flat strip of sheet material.

Herefore, the manufacture of thin-walled tubing (used widely in irrigation systems) has been considered very difficult, especially where the ratio of tube diameter to wall thickness has exceeded 60 to 1, the ratios greater than about 100 to 1 have been considered almost impossible to achieve in a continuous process. The present invention makes possible quantity manufacture of tubing with diameter-to-wall-thickness ratios of 200 to 1 and greater. For example, tubing ten inches in diameter can be made rapidly and continuously from 0.050" aluminum strip material. Other sizes and other materials are also quite practical. Thus, one object of the invention is the continuous manufacture of thin-walled tubing of relatively large diameter.

One important feature of the invention contributes greatly to the achievement of this object: the flat strip material from which the pipe is formed is first precurled along its edges to form flanges of substantial length by which the material may be shaped, guided, and kept in proper alignment as it progresses through the mill. The flanges also help by reinforcing and stiffening the edges of the thin strip. Stationary guide strips engage the flanges, and curve and gather the moving strip into a round shape; then a set of cluster rolls forms the rounded strip from a generally conical shape into a cylindrical shape, all the metal-flow caused by forming taking place at this point and without any heating.

The invention has solved the welding problems that have stood in the way of successful manufacture of thin-walled tubing. Heretofore, attempts were made to seam the tubing by butting the two edges together or lapping and then welding them, but accurate control over the seam was not possible with this construction. Waves or rippling tended to occur and there was no way to get rid of it and get the smooth surface and good contact necessary for welding. The fact that the material has to work and flow as it changes from a conical to a cylindrical shape, has aggravated the difficulties in keeping the edges correctly aligned and in good contact during the welding operation.

This problem has been solved in the present invention by utilizing the edge flanges; stationary guide bars keep them aligned and in contact against each other after the forming operation and until the seam is welded. Since flanges long enough to serve the guiding and alignment formations mentioned above could not be properly welded, and if welded, would project out too far, the flanges are trimmed off by a milling cutter just before the tubing reaches the welding station—and after the seam alignment has been established. At the time of welding, the shortened flanges are in intimate contact with each other and project up only a short distance—equivalent to about one thickness of the strip material.

Another problem solved by the invention is the elimination of weakness at the welded seams which is caused by the annealing effect of heat on metal. The strip material itself has previously been cold-worked or heat treated and is much stronger than is fully annealed metal, and the seam may have its tensile strength reduced to about 60% of its value elsewhere by this annealing. The present invention solves this problem by cold-working the metal adjacent the weld shortly after the welding operation has been completed. This cold working restores the tensile strength of the metal to approximately its original value.

Another problem solved by the invention is that seamed tubing tends to result in a different thickness at the seam from that of the rest of the tubing. Such differences in thickness cause leaks when attempts are made to press-fit the tubing, and even gaskets leak at the edges of the bump. The present invention solves this problem by the combination of welding the shortened flanges and by the cold-working just referred to—which is carried out in such a manner that the seam is flattened to substantially the same thickness as the remainder of the wall. There is no bump at or near the weld, and both the inside and outside surfaces of the wall are smooth. As a result, press-fitting of tubing sections becomes very practical and free from leaks.

As implied above, it is among the objects of this invention to produce thin walled pipe that is smooth both inside and out, and uniformly strong.

It will be appreciated that the solution of all the above problems are also objects of the invention and need not be rehearsed further.

Another object of the invention is the provision of a relatively inexpensive tube mill. Heretofore satisfactory tube mills for thin walled tubing have cost between $150,000 and $200,000 and more, and still could not produce thin-walled tubing in large diameters. A tube mill may be constructed according to the present invention at a cost of between $25,000 and $45,000, and it will produce better pipe than the expensive tube mills heretofore in use. Furthermore, there is apparently no limit to the size of thin-walled tubing that can be made.

Other objects and advantages of the invention will appear from the following description of a preferred embodiment thereof.

In the drawings:

Fig. 1 is a simplified diagrammatic view of an apparatus embodying the principles of the invention. This view also includes an indication of the shape of the metal strip at various stations.

Fig. 2 is a view in section taken along the line 2—2 of Fig. 1, showing one pair of precurling rolls.

Fig. 3 is a top plan view of the entering end of the transitional guide stringers and related parts nearer the precurling rolls, where the gathering of the flanged precurled strip into a round shape is begun. The metal strip is not shown in this view, nor in the succeeding one.

Fig. 4 is a top plan view of the remainder of the guide stringers shown in Fig. 3 and the related parts that finish rounding the strip and present it to the forming rolls.

Fig. 5 is a view in section taken along the line 5—5 in Figs. 1 and 4.

Fig. 6 is a simplified view in side elevation and in section of the mandrel portion of the apparatus, from the forming rolls to the cut-off station.

Fig. 7 is a view in section taken along the line 7—7 in Fig. 6 and showing the cluster forming rolls which receive the rounded strip from the transitional stage in a conical shape and form it into a cylindrical shape, coldflowing the material through a double curvature at this place.

Fig. 8 is a view in section taken along the line 8—8 in Fig. 6 and showing the milling cutter.

Fig. 9 is a view in section taken along the line 9—9 in Fig. 6 and showing the welding station.

Fig. 10 is a view taken along the line 10—10 in Fig. 6 and showing the flattening station.

As shown in Fig. 1, the apparatus feeds a strip of sheet material 20 through a precurling station A, transitional stage B (where the strip is curved around, but without causing any metal flow), a forming station C (where the strip is permanently formed into a cylindrical shape), a flange-milling station D, a welding station E, a driving and cooling stage F, and a weld-flattening and cold-working station G, whence it may pass to a cut-off station H. The structure and operation at each of these stations or stages will now be described in detail.

The precurling stage A

While any thin weldable material is suitable, including plastics, the process will be described principally in connection with the use of a metal strip 20, preferably thin gauge aluminum (e.g. 0.050" thick), though stainless steel, steel, copper or brass and other weldable metals may be used.

Generally, it is most convenient to obtain the strip 20 in the form of a large coil 21 that may be supported for free rotation on an axle 22. The axle 22 may be mounted in a suitable support which may be considered as part of an extended base frame 24, of which only fragments are shown here (e.g., in Figs. 8 and 9). The frame 24 may include the floor or other extended horizontal support and various vertical portions that support the other parts of the apparatus. It may be mentioned at this point that instead of exhausting one coil 21 of strip metal completely and then installing another separate coil 21, it is normally preferable to weld the beginning of the new coiled strip to the end of the preceding coil, so that the strip 20 is continuous in spite of the change of coil, especially so long as tubing of one diameter is being manufactured, and even when changing sizes, this is preferred. As any portion of the strip 20 unrolls from the coil, it has at the point J—J the flat shape shown at 100 in Fig. 1.

From the coil the strip 20 may pass over or under one idler roller 26 or between a pair of idler rollers. Although not absolutely necessary, the idler roller 26 does help to hold the strip flat, aligned, and free from cant as it is propelled into the precurling station A. As shown in Fig. 1, this station A may comprise two pairs of normally idling precurling rolls, the first pair 30, 31 imparting the shape shown at 101 in Fig. 1, below the line K—K, and the second pair 32, 33 imparting the shape shown at 102, below the line L—L, where flanges 35 extend substantially perpendicular to the curved adjacent portions 36 of the strip 20. The curved portions 36 help to begin the curving of the strip 20 into a round shape.

The flanges 35 are of substantial height and perform very important functions in strengthening the thin material during subsequent operations and in guiding and aligning the strip through the tube mill, in cooperation with various guide means. This important feature of the invention needs to be stressed, because earlier attempts to form large-diameter, thin-walled tubing found it almost impossible to eliminate waves along the edges, and these waves made welding almost impossible. The provision of these flanges makes accurate guidance possible and eliminates waves and ripples.

While the precurling rolls 30, 31, 32, 33 have been described as idling, they may be driven through sprockets 37 when starting a strip 20 into the machine, but when the strip 20 reaches the forming rolls C, they are driven from there and later from the driving rolls F; the sprockets 37 are thereupon disengaged from any drive.

It is desirable to provide creasing rolls 38 along each edge adjacent the point where the strip 20 emerges from the second precurling rolls 32, 33 in order to make a tight crease where the flange 35 joins the portion 36. This crease can be made by the second precurling rolls 32, 33, but it is advisable, even though not essential, to complete the crease in this third stage. Also these flange corner rollers 38 insure that when the strip 20 reaches the welding stage E, the flanges will be parallel and abut not only at the top but also at the bottom, thereby strengthening the weld.

The transitional stage B

Between the precurling station A and the forming station C the flat strip 20 is curved from its generally flat shape (as at 102) into an intermediate generally U-shape at M—M as shown at 103, and finally at N—N into an almost-closed, conical, circular shape shown at 104, in which it is presented to the forming station C, the two flanges 35 actually or practically touching each other at the time of presentation. It should be noted that the length of the transitional stage B between the precurling station A and the forming station C is important, for by making this transition long enough, the forming stresses in station C can be greatly reduced. In fact, the stresses are inversely proportional to the length of the transition, the conical shape with which they are presented to the forming station C more nearly resembling the ultimate cylindrical shape when the transitional stage is very long than when it is short. By having the transitional stage B approximately 27 feet long, it has proved possible to make ten inch pipe with ease from 0.050" aluminum strip.

This transitional curling is accomplished partly by the gathering action of the forming rolls C, but is greatly aided by a pair of guide stringers 40, 41, shown best in Figs. 3, 4 and 5, which engage the flanges 35 about midway between the pre-curl station A and the forming station C and converge them. The guide stringers 40, 41 basically are angle irons that have been twisted and laid out along an inclined and converging path. Preferably the stringers 40, 41 are faced with friction-reducing Micarta facing 42 that actually engage the flanges 35 and gather the flanges 35 in toward each other.

To prevent buckling, especially when the mill is reversed a few inches prior to restarting (so as to get a continuous weld line), it is advisable though not necessary, to employ a transition hold-down roller set 43 between the precurling station A and the guide stringers 40, 41, preferably near the precurling station A, at one or more locations along the transitional stage B. This set 43 includes one or more rollers (three are desirable) which ride on the upper surface of the strip 20, holding it down to prevent any buckling. Also, another set 44 of two wheels 45, 46 may be provided near the end of the guide stringers 40, 41 for the same purpose( see Figs. 4 and 5).

It is also advisable during the guiding stage to thoroughly clean the edge portions of the strip 20 so that when welding is done, the weld will be perfect and will not be marred by any foreign matter on the flanges 35 or adjacent portions 36. This may be done by providing a couple of pairs of cleaning brushes 47 along the sides, as shown in Fig. 3. Also, one or more sets of support members 48 for the stringers may be provided.

With some thicknesses of strips of some materials, the guide stringers 40, 41 are necessary only during the initial stages of threading the strip 20 into the forming station C, and can be omitted thereafter, the transitional stage taking care of itself. However, surer results are obtained by retaining them, and retention is necessary for use with some materials and for some thicknesses of all materials.

The forming station C

Forming is done at one point, and only one, by a set 50 of cluster rolls in cooperation with some adjacent parts. Preferably, as shown in Fig. 7, four outside cluster rolls 51, 52, 53, and 54 and two inside cluster rolls 55 and 56 are provided. The rollers 51, 52 preferably at the top and bottom respectively, may be driven and act as part of the propelling means that moves the strip through the apparatus. The upper cluster roll 51 is provided with a central slot 57 which permits passage of the flanges 35, and it will be seen that all the upper rolls, until the flattening stage G is reached, have such a slot. Except for the slot 57, the four outer rolls 51, 52, 53, and 54 are concave along one-fourth of a circle each and are positioned to provide a perfect circle around the strip 20. Beveled edges 58 serve to interlock the rolls 51, 52, 53, and 54 and prevent any distortion.

The two internal rolls 55 and 56 are convex and are perferably positioned directly opposite the upper and lower driven rolls 51, 52. They are mounted for free rotation in contact with each other in openings in a mandrel 60 beyond whose side walls they project. This mandrel 60 is secured to an anchor 65 adjacent the set 50 of cluster rolls, perferably just in front of them. The mandrel's outer diameter is substantially smaller than the inner diameter of the finishing tubing, but it is provided with a plurality—perferably four—of longitudinally extending Micorta strips 61, 62, 63, and 64, a ong which the tubing slides. Two of these strips 63 and 64 are continuous and fall opposite the side cluster rolls 53, 54. The strips 61 and 62 extend respectively along the top and bottom of the mandrel 60, and they are interrupted by the inner cluster rolls 55 and 56. The strip 61 is specially shaped to serve as a back-up bar at the milling and welding stages.

Just in front of the cluster rolls and encircling the mandrel 60 is a girdle 66 which acts to assist the guide strips 40, 41 in holding the strips 20 in the round and feeding it into the cluster rolls 50 with the flanges 35 in their proper position. It will be noted that the girdle 66, which is supported by suitable frame members, surrounds all except the upper flanged portion of the strip 20, having a gap 67 through which the flanges 35 pass.

The cluster rolls 51, 52, 53, 54, 55 and 56 do all of the actual forming of the strip 20 into a tube, since the shaping done in the transitional stage B is all of a temporary nature. The cluster rolls 50 are the only place where there is any metal flow, the metal flowing through a double curvature while being held under pressure and worked so that it will not lose any of its tensile strength. It will be noted that this forming is done cold and therefore is not to be compared to machines where forming is done at temperatures of around 1400° F. The strip 20 leaves the cluster rolls 50 at O—O permanently formed into a cylindrical tube, in the shape shown at 105 in Fig. 1. The flanges 35 are now in contact and they remain that way from now on.

Between the forming station C and the welding station E a pair of metal guide bars 70, 71 having Micarta faces 72 engage the flanges 35 and hold them against each other. No great length is necessary to insure proper alignment, but some length is advisable so that perfect alignment can be assured before welding.

The flange milling station D

The next operation is to mill down the flanges 35 to prepare them for the welding operation. As has been implied earlier, flanges 35 of substantial length are necessary for the transitional stage B and for guiding and alignment after the forming station C to get the strip ready for accurate welding, but such flanges are much too long to be left on during the welding operation. Consequently a milling cutter 74 supported above the tube strip trims the flanges 35 until flanges 75 are obtained short enough to give a weld which does not stick up from the pipe any more than is necessary. As a matter of fact, the amount of material remaining on the flanges 75 is roughly one metal thickness above the outside of the pipe. This short flange 75 still affords adequate engagement with the bars 70, 71 for guiding the short distance between the milling cutter 74 and the welding station E. The guide bars 70, 71 are cut down and are shorter at the milling cutter and extend up to within about half an inch from the welding station E. It may again be mentioned that the Micarta strip 61 serves as a back-up bar for the milling operation. The cutter 74 is in a housing 76, whence scrap is conveyed by a suction conduit 77.

After milling, the tube-strip appears at P—P as shown at 106 in Fig. 1.

The welding station E

The shortened flanges 75 are now welded by a suitable welder 80, preferably of the tungsten-electrode, shielded arc-in-inert-gas type (known as heliarc), though resistance welding and other suitable types may be used.

The pack-up strip 61 is here provided with a shallow recess 82 (about ¼" deep by ½" wide) to prevent scorching. The guide bars 70, 71 terminate just in front of the welder 80, but a second girdle 81 (like the girdle 66) is provided in alignment with the welder 80 to surround the tube-strip and prevent deformation due to the heat, holding the tube in position while the weld solidifies and the metal regains strength sufficient to hold together.

To prevent deformation of the pipe due to the fact that the pipe is much hotter at the seam than elsewhere, it is preferable, though not always necessary, to heat the lower portion of the pipe, to about 200° F., and this may be done by a gas heater 83 or similar device, which may be located in the transitional stage B.

The cooling and driving stage F

After the welder 80 has completed the seam, the pipe appears at Q—Q as in 107 in Fig. 1, and its seam 84 is permitted to cool somewhat as it moves along, the other walls of the pipe being held in against the Micarta strips 62, 63, and 64 by a third girdle 85 to prevent deformation.

Next, the welded tube passes through three sets 86, 87, and 88, of drive rolls, which provide the principal motive power for moving the strip 20 through the apparatus. The outside rolls of each set, top and bottom, are preferably driven but the inside rolls need not be; they serve principally to maintain pressure evenly on the wall of the pipe allowing considerable pressure to be applied to the drive rolls without the tube itself having to take the strain. The top roll 89 in each set is preferably slotted in each instance so that it does not touch the actual seam 84, and is preferably water-cooled to help reduce the temperature of the p pe wall adjacent the weld, and thereby indirectly to cool the weld itself. Such water-cooling is well known; for example, see Patent No. 1,085,639 to Snodgrass. The pipe appears substantially the same as at 107.

The flattening and cold-working station G

If the tubing were left in this state and simply cut to length, there would be several undesirable results. In the first place, neither the inside nor outside surfaces would be smooth, but there would be a bump at the seam 84 on each surface at the weld. This would mean that any press fittings would leak, and gasket fittings would also tend to leak adjacent the weld. Furthermore, the tensile strength of the material, particularly where aluminum pipe is used, is severely affected by the heat of welding, which fully anneals the metal at this point. Tests have confirmed theory and prove that the welding does fully anneal the metal; so if nothing is done, a weak line runs along the entire pipe. In fact the area at and adjacent to the weld 84 is only about 60% as strong as the remaining area of the pipe.

Therefore, after the weld 84 has been cooled to a temperature of approximately 250 to 300 degrees F., a flattening roll 90 with its back-up roll 91 engage the weld and cold-work it. The flattening roll 90 is driven and together with the rolls 92 and 93 help the rolls 51, 52, 86, 87, and 88 propel the strip 20. More important, the flattening of the weld 84 results in a smooth inside wall and a smooth outside wall at R—R, as shown at 108 in Fig. 1, and the thickness of the tubing is now uniform. Just as important, the cold-working of the annealed area restores to it the original tensile strength of the strip 20.

When the machine is in operation, test samples a few inches in length are taken off about once an hour and subjected to the standard breakage tests for tensile strength. These tests have shown consistently that for a tubing whose fully annealed strength is 15,000 p.s.i., cold working of the weld according to this invention will increase the tensile strength thereto between 22,000 and 27,000 p.s.i., or approximately 24,000 p.s.i. on the average. In other words, an increase up to about 60% in tensile strength is obtained by this important step.

The flattening rolls 90 and the driving rolls 86, 87, and 88, also help to control the tendency of the pipe to curl, due to the fact that when it cools, it tends to shrink at the weld and therefore to pull up in the direction of the seam. The cold rolling lengthens the welded seam area at this critical time and offsets the tendency to curl upwardly.

After flattening the seam, the only action remaining is to saw the tubing to its desired lengths and this may be done by a standard traveling saw H (cf. Patent 2,502,012) or by any other cutting means. In itself, this step forms no part of the invention, and construction of the saw need not therefore be described.

*Operation*

The motive power for propelling the strip 20 through the apparatus is supplied by the forming cluster rolls 51 and 52, the sets of driving rolls 86, 87 and 88, and by the flattening roll 90 and its opposite number 93. However, at the beginning of operations, where the very first strip is being threaded into the machine and at subsequent times where a free end of a coil 21 must be fed into the machine, the precurling rolls 30, 31, 32 and 33 may have their sprockets 37 connected to driving means. When the end of the strip has been fed up along the guide stringers 40, 41 and into the cluster rolls 50, the top and bottom cluster rolls 51 and 52 preferably take over the propulsion of the strip, and the sprockets 37 of the precurling rolls 30, 31, 32 and 33 are disengaged, so that the strip is thenceforth pulled along the guide stringers 40 and 41 and is therefore under tension. They remain disconnected so long as no new rethreading is necessary. As stated earlier, the transition from one coil 21 to another is normally made by welding laterally the beginning of the new coil to the end of the old one so that the metal strip may, for all practical purposes, be considered continuous, and months at a time may go by without having to thread in a new strip.

The strip 20 is driven through the first pair of precurling rolls 30, 31, where it is formed into the shape shown at 101, and through the second precurling rolls 32, 33, where it is formed into the shape shown at 102. The flanges 35 then serve to guide the strip 20 along the transitional stage by engagement with the guide stringers 40 and 41, along which the strip 20 is pulled under tension up to the cluster rolls 50, during which time the strip has been changed through the stage shown at 103 into the round conical shape shown in cross section at 104, in which it is presented to the cluster rolls 50. If desired, the flanges 35 may be more tightly creased by creasing rolls 38 just past the second precurling rolls 32, 33 and may be cleaned by brushes 47. Also, it is advisable to employ one or more sets of transitional rolls 43 to prevent buckling. In order to prepare for the welding stage, it is a good idea with many materials to heat the central portion of the strip 20 (bottom of the tube) by a heater 83, also located in the transitional stage.

The guide strips 40, 41 and the girdle 66 gather the flanges 35 together and guide the strip into the cluster rolls 50 and around the mandrel 60. The cluster rolls 50 form the strip into a cylindrical shape, the metal flowing cold along a double curvature so that it emerges as shown at 105 in a permanently cylindrical shape.

As the strip 20 leaves the cluster rolls 50, it is guided by the bars 70 and 71 engaging the flanges 35 and holding them against each other. In this manner the strip 20 is propelled past the milling cutter 74 where the flanges 35 are trimmed off short, giving the strip the appearance shown at 106. Then the shortened flanges 75 are guided by the bars 70 and 71 into the girdle 81 at the welder 80. There, the shortened flanges are welded into the seam 84, as shown at 107.

While the seam 84 cools, the tubing is guided between the mandrel 60 and a third girdle 85, and through the driving rolls 86, 87 and 88, the upper driving roll 89 of each set preferably being water cooled and being slotted, so that while the weld 84 is not touched, it is cooled because heat is being carried away from the adjacent portion.

The wall 84 can now be cold-worked by the flattening rolls 90 and 91 to obtain uniform pipe thickness, smooth inner and outer walls, and to restore the original tensile strength of the strip material as at 108. Then the tubing may be sawed to desired lengths by the standard traveling saw H.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

What is claimed is:

1. A tube mill for the continuous manufacture of single-seam welded tubing from a strip of sheet metal, including in combination: means for continuously feeding said metal strip into said mill; precurling means for flanging the longitudinal edges of said strip; guide means adapted to engage said flanges and fold said moving metal strip into a generally conical, round shape, said feeding means pulling said strip along said guide means under tension; a single set of forming rolls adapted to engage said rounded strip and to form it from a conical to a cylindrical shape, all metal flow of forming taking place at this point, whereby the strip is permanently formed into said cylindrical shape; a cylindrical mandrel around which said cylindrically-formed strip is moved; second guide means adapted to hold said flanges of the cylindrically shaped strip aligned parallel to and touching each other; a milling cutter to trim said flanges down to approximately the wall thickness of said strip; means to weld said trimmed flanges together to change the cylindrical strip into complete tubing; and flattening means spaced from said weld means for engaging the partially cooled welded area and cold-working it until it is the same thickness as the remainder of the tubing.

2. The mill of claim 1 in which said guide means comprise an inclined and converging pair of twisted angle irons.

3. The mill of claim 2 in which said guide means are faced with a non-metallic wear strip.

4. The mill of claim 1 in which said second guide means comprise a pair of bars faced by non-metallic strips and extending from said forming rolls to said weld means.

5. The mill of claim 1 wherein there are water-cooled rollers in engagement with the upper portion of said tubing beyond said weld means and said flattening means, said rollers being slotted to pass the weld but in engagement with the adjacent area on each side of said weld.

6. A tube mill for the continuous manufacture of single-seam welded tubing from a strip of sheet metal, including in combination: feeding means for continuously moving a said metal strip; means for forming flanges along the edges of said strip; guide means adapted to engage said flanges and gather said moving metal strip into a round cross-sectional shape, said feeding means lying beyond said guide means and pulling said strip along said guide means under tension; a single set of forming rolls adapted to engage said rounded strip and to form it into a cylindrical shape, all metal flow of forming taking place at this point, whereby the strip is permanently formed into said cylindrical shape; second guide means beginning just beyond said forming rolls and adapted to hold said flanges of the cylindrical strip aligned and parallel to and touching each other; a milling cutter positioned along said second guide means to trim said flanges; means to weld said trimmed flanges together, said second guide ending just prior to said weld means; and means spaced from said weld means for engaging the partially cooled welded area and cold-working it.

7. A tube mill for the continuous manufacture of single-seam welded tubing from a strip of sheet metal, including in combination: means for holding a coiled roll of said metal strip so that the strip can unroll: precurling rolls for bending the longitudinal edges of said strip to provide a pair of perpendicular edge flanges; a pair of first guide strips adapted to engage said metal strip at and adjacent said flanges to curve said metal strip into a round cross-sectional shape; a set of cluster rolls at the end of said first guide strips, adapted to engage the outer wall of the strip and to form said strip from a conical to a cylindrical shape, all metal flow of forming taking place at this point, whereby the strip is permanently formed into said cylindrical shape; a first girdle immediately preceding said cluster rolls and adapted to encircle the rounded strip; a mandrel beginning adjacent said cluster rolls and around which said cylindrically-formed tubing moves; a pair of second guide strips parallel to each other and adapted to hold said flanges against each other; a milling cutter adapted to trim said flanges down to approximately the wall thickness of said strip; means to weld said flanges together to complete the tubing; second and third girdles around said tubing, one at said weld means and the other just beyond; means spaced from said weld means for engaging the partially cooled welded area and cold-working it; and means to engage the walls of the welded tubing to move it and said strip portion through said mill, said sheet metal strip being under tension as it is pulled along said guide strips.

8. A tube mill for the continuous manufacture of single-seam welded tubing from a strip of sheet metal, including in combination: an extended base frame; freely rotatable means supported by said frame for holding a coiled roll of said metal strip so that the strip can unroll; a pair of precurling rolls supported by said frame for bending the longitudinal edges of said strip to provide a pair of perpendicular edge flanges and imparting a beginning curve to said strip; a pair of creasing means for creasing the bend at said flange sharply; a pair of inclined and conveying first guide strips supported by said frame, each comprising a twisted angle iron faced with Micarta a non-metallic wear strip and adapted to engage said metal strip at and adjacent said flanges to curve said metal strip into a round cross-sectional shape; means for heating the center of said strip; a set of four outer concave and two inner convex cluster rolls supported by said frame at the end of said first guide strips, adapted to engage the outer walls of the strip and to form said strip from a conical to a cylindrical shape, all metal flow of forming taking place at this point, whereby the strip is permanently formed into said cylindrical shape; a first girdle supported by said frame immediately preceding said cluster rolls and adapted to encircle the rounded strip; a cylindrical mandrel supported by said frame and beginning prior to said cluster rolls around which said cylindrically-formed tubing moves; a pair of second guide strips parallel to each other and adapted to hold said flanges against each other; a milling cutter adapted to trim said flanges down to approximately the wall thickness of said strip; means to weld said flanges together to complete the tubing; second and third girdles around said tubing, one at said weld means and the other just beyond; means spaced from said weld means sufficiently to provide cooling of the welded area for engaging the cooled welded area and cold-working it; and driving means to engage the walls of the welded tubing to move it and said strip portion through said mill, said driving means being principally located between said weld means and said cold-working means and pulling said strip along said guide strips under tension.

9. A method for forming welded tubing continuously from a roll of very thin flat strip stock in which the ratio of the tube diameter to stock thickness is in the order of 200 to 1, which includes the steps of (a) forming a stiffening and guiding flange on each edge of the strip, which flange is longer than could be successfully welded and rolled down to equal the adjacent wall thickness in the finished tube; (b) engaging these extra long stiffening and guiding flanges and forcing them toward each other so as by this forcing alone to bring the metal under tension up to the round shape with the edges of the flanges substantially straight and in good welding contact; (c) shaping and permanently forming the tube into a true cylindrical shape while the flanges remain full length and held together; (d) trimming down the length of the flanges to a suitable length for welding just before the welding is done; and (e) welding said trimmed flanges.

10. The method of claim 9 in which the welding is followed by flattening and cold-working the weld to the thickness of the remainder of the tubing wall.

11. A tube mill for the continuous manufacture of single-seam welded tubing from a strip of sheet metal, including in combination: means for continuously feeding said metal strip into said mill; precurling and flanging means for precurling said strip and flanging its longitudinal edges; guide means adapted to engage said flanges and fold said moving metal strip into a generally conical, round shape, said feeding means lying beyond said guide means and pulling said strip along said guide means under tension; metal-flow forming means adapted to engage said rounded strip and to permanently form it from a conical to a cylindrical shape, all metal flow of forming taking place at this point; support means around which said cylindrically-formed strip is moved; second guide means adapted to hold said flanges of the cylindrically shaped strip aligned parallel to and touching each other; cutting means to trim said flanges down to approximately the wall thickness of said strip; means to weld said trimmed flanges together to change the cylindrical strip into complete tubing; and flattening means spaced from said weld means for engaging the partially cooled welded area and cold-working it until it is the same thickness as the remainder of the tubing.

12. A tube mill for the continuous manufacture of single-seam welded tubing from a strip of sheet metal, including in combination: means for continuously feeding said metal strip into said mill; means for flanging the longitudinal edges of said strip; guide means adapted to engage said flanges and fold said moving metal strip into a generally conical, round shape, said feeding means lying beyond said guide means and pulling said strip along said guide means under tension; a set of metal-flow forming rolls adapted to engage said rounded strip and to form it permanently from a conical to a cylindrical shape, all metal flow of forming taking place at this point; second guide means adapted to hold said flanges of the cylindrically shaped strip aligned parallel to and touching each other; cutting means to trim said flanges down to approximately the wall thickness of said strip; and means to weld said trimmed flanges together to change the cylindrical strip into complete tubing.

13. The mill of claim 12 in which said guide means comprise an inclined and converging pair of guide strips having a twist shape.

14. A tube mill for the continuous manufacture of single-seam welded tubing from an edge-flanged strip of sheet metal, including in combination: means for continuously moving edge-flanged metal strip; guide means adapted to engage said flanges and gather said moving metal strip into a round cross-sectional shape, said feeding means lying beyond said guide means and pulling said strip along said guide means in tension; metal-flow forming means adapted to engage said rounded strip and to permanently form it into a cylindrical shape, all metal flow of forming taking place at this point; second guide means beginning just beyond said forming rolls and adapted to hold said flanges of the cylindrical strip aligned and parallel to and touching each other; cutting means positioned along said second guide means to trim said flanges to the amount needed for proper welding; and means to weld said trimmed flanges together, said second guide ending just prior to said weld means.

15. A tube mill for the continuous manufacture of single-seam welded tubing from a strip of sheet metal, including in combination: feeding means for continuously moving said metal strip; means for flanging the longitudinal edges of said strip; guide means adapted to engage the flanges and gather said moving metal strip into a round cross-sectional shape, said feeding means lying beyond said guide means and pulling said strip along said guide means in tension; metal-flow forming means for engaging said rounded strip and forming it permanently into a cylindrical shape, all metal flow of forming taking place at this point; cutting means to trim said flanges after forming to the amount needed for proper welding; and means to weld said trimmed flanges together.

16. A method for the continuous manufacture of single-seam welded tubing from a strip of thin sheet metal, comprising driving said metal strip continuously at a substantially constant rate while sequentially performing the following steps at stations past which the strip is moved; precurling and flanging said strip by bending the longitudinal edges of said strip to provide a pair of perpendicular edge flanges and imparting a beginning curve to said strip; curving said metal strip conically into a round cross-sectional shape with the flanges adjacent each other, while said strip is under tension, solely by progressively forcing said flanges around; permanently metal-flow forming said rounded strip from a conical to a cylindrical shape; milling said flanges down to approximately the wall thickness of said strips; and welding the remaining stub of said flanges together to form seamed tubing.

17. A method for the continuous manufacture of single-seam welded tubing from a strip of thin sheet metal, comprising driving said metal strip continuously at a substantially constant rate while sequentially performing the following steps at stations past which the strip is moved; precurling said strip and flanging its longitudinal edges to provide a pair of perpendicular flanges; engaging said flanges and progressively guiding them toward each other while said strip is under tension, so that by that means alone said metal strip is curved generally conically into a rounded shape and the flanges are adjacent each other; permanently forming said rounded strip into a cylindrical shape; milling said flanges down short to the amount needed for proper welding; welding said shortened flanges together; and cold-working the welded area to flatten it to the same thickness as the pipe and strengthen its tensile strength.

18. A method for forming welded tubing from a roll of flat weldable strip stock in which no forming rolls are necessary from the time a gripping flange is formed on the edges of the strip until the strip is brought into full round cylindrical shape by a set of cluster rolls, comprising the steps of forming said gripping flange, engaging said flanges and urging them in toward each other while said strip is under tension, so as to progressively gather the strip into a round shape without actual metal flow, permanently forming it into a cylindrical shape by cold working wherein round shape, trimming off said flange to the amount needed for proper welding, and welding the seam where the flanges abut.

References Cited in the file of this patent

UNITED STATES PATENTS

| | | |
|---|---|---|
| 328,974 | Ritchie | Oct. 27, 1885 |
| 901,637 | McKenzie | Oct. 30, 1908 |
| 1,080,925 | Palmer | Dec. 9, 1913 |
| 1,085,639 | Snodgrass | Feb. 3, 1914 |
| 1,205,742 | Hickson | Jan. 21, 1916 |
| 1,812,409 | Leckie | June 30, 1931 |
| 1,884,467 | Windsor | Oct. 25, 1932 |
| 1,890,077 | Elting | Dec. 6, 1932 |
| 1,896,416 | Quarnstrom | Feb. 7, 1933 |
| 1,944,094 | Mayweg | Jan. 16, 1934 |
| 2,007,149 | Dreyer | July 2, 1935 |
| 2,029,044 | Westlinning | Jan. 28, 1936 |
| 2,044,491 | Anderson | June 16, 1936 |
| 2,066,025 | Zublin | Dec. 29, 1936 |
| 2,098,989 | Yoder | Nov. 16, 1937 |
| 2,302,163 | Anderson | Nov. 17, 1942 |
| 2,329,938 | Ortiz | Sept. 21, 1943 |
| 2,580,502 | Anderson | Jan. 1, 1952 |

FOREIGN PATENTS

| | | |
|---|---|---|
| 601,400 | Great Britain | May 5, 1948 |